United States Patent [19]

Ohmori et al.

[11] Patent Number: 5,033,036
[45] Date of Patent: Jul. 16, 1991

[54] REPRODUCING APPARATUS INCLUDING MEANS FOR GRADUALLY VARYING A MIXING RATIO OF FIRST AND SECOND CHANNEL SIGNAL IN ACCORDANCE WITH A VOICE SIGNAL

[75] Inventors: Seiji Ohmori; Eisaku Kawano; Tasuku Tsuruga; Takeshi Mawatari; Hiroshi Ohtsubo, all of Saitama, Japan

[73] Assignee: Pioneer Electronic Corporation, Tokyo, Japan

[21] Appl. No.: 469,653

[22] Filed: Jan. 23, 1990

[30] Foreign Application Priority Data

Mar. 9, 1989 [JP] Japan .................................. 1-55057

[51] Int. Cl.$^5$ ............................................. H04B 1/20
[52] U.S. Cl. ............................................. 369/3; 369/4
[58] Field of Search .................. 369/3, 4; 360/27, 55, 360/61; 379/201, 202; 381/26, 61

[56] References Cited

U.S. PATENT DOCUMENTS 4,306,114 12/1981 Callahan .................................. 369/3
4,434,325 2/1984 Kobayashi et al. ...................... 369/3

FOREIGN PATENT DOCUMENTS 303700 2/1989 European Pat. Off. .
60-247806 12/1985 Japan ...................................... 369/3
63-316593 12/1988 Japan .

Primary Examiner—Stuart S. Levy
Assistant Examiner—Hoa Nguyen
Attorney, Agent, or Firm—Sughrue, Mion, Zinn, Macpeak & Seas

[57] ABSTRACT

A reproducing apparatus mixes the voice information from a microphone and the information reproduced from a recording medium in which a vocal signal plus an instrumental signal is contained as a first signal in a first channel and only an instrumental signal is contained as a second signal in a second channel. A first mixing circuit mixes the first signal and the second signal. The output of the first mixing circuit is mixed by a second mixing circuit with the voice information from the microphone. A control circuit or audio detecting circuit provides a control signal in accordance with the level of the voice information from the microphone. The control signal controls a selection control circuit to gradually and smoothly vary the mixing ratio of the first signal and the second signal when mixing these two signals.

5 Claims, 5 Drawing Sheets

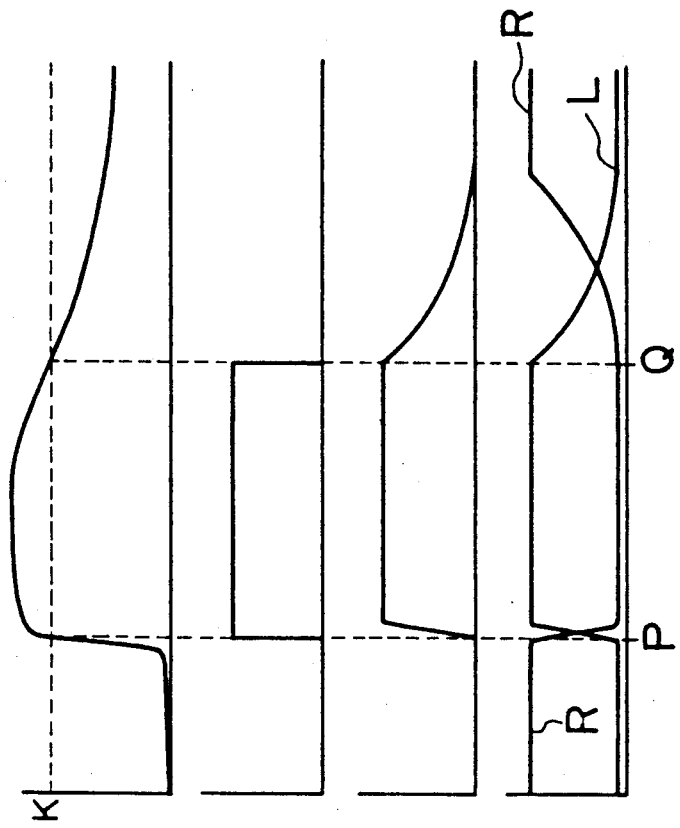

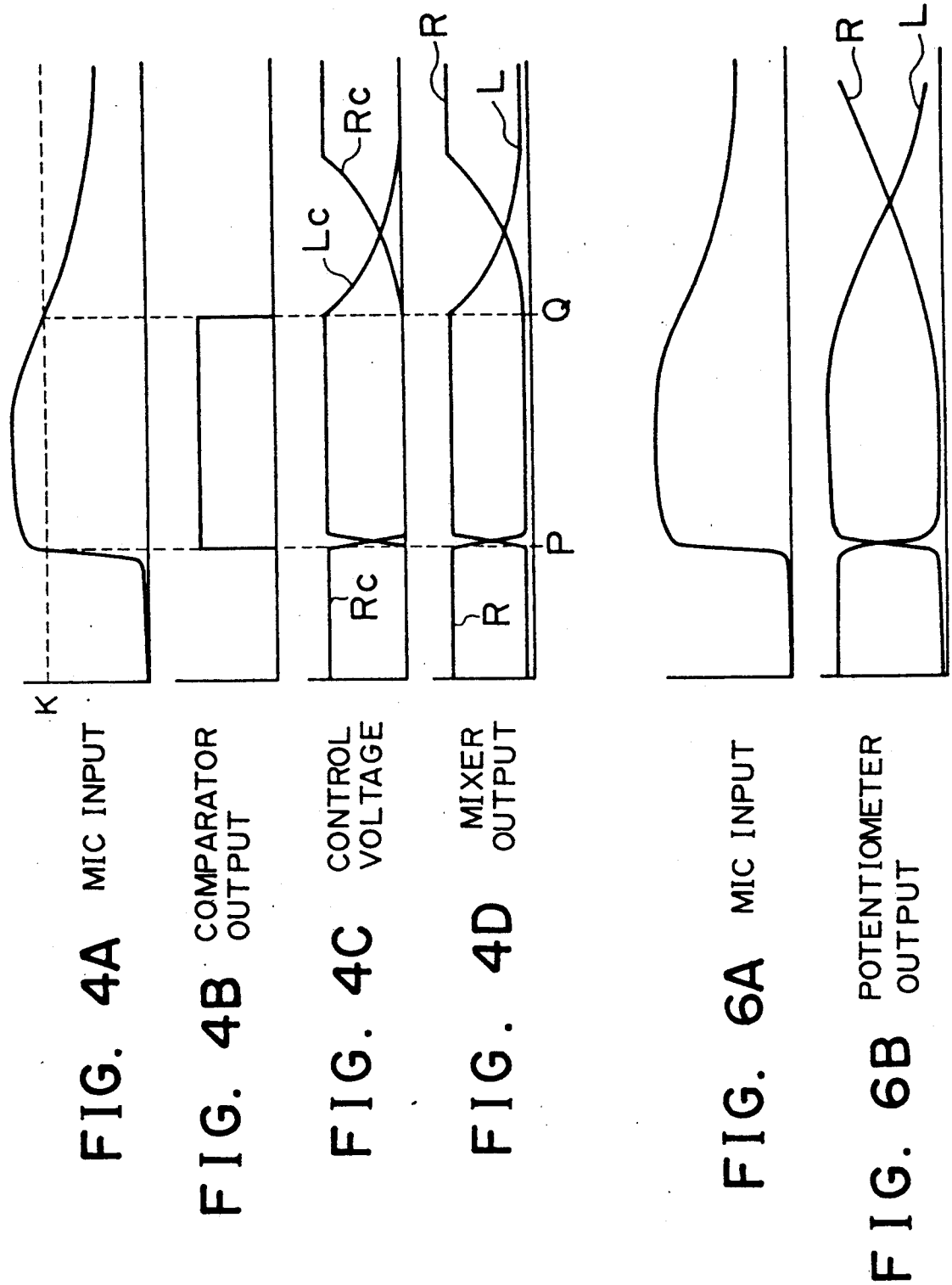

REPRODUCING APPARATUS INCLUDING MEANS FOR GRADUALLY VARYING A MIXING RATIO OF FIRST AND SECOND CHANNEL SIGNAL IN ACCORDANCE WITH A VOICE SIGNAL

BACKGROUND OF THE INVENTION

1. Field of the Invention

The present invention relates to a reproducing apparatus, and more particularly to a voice selecting circuit capable of varying in accordance with the input level to a microphone the mixing level of a vocal plus instrument part and an instrumental part without vocal which parts are reproduced from a recording medium in which the two parts are separately recorded.

2. Prior Art

A KARAOKE is an apparatus that radiates through a loudspeaker the accompaniment for a song reproduced from a recording medium and the user's vocal when the sings that song toward a microphone to the accompaniment. The user can enjoy singing a song just like a professional singer who sings to a professional orchestra behind. A conventional KARAOKE apparatus is provided with a voice selecting function or vocal selecting function in which when a user sings a tune, the accompaniment for that tune reproduced from a recording medium such as a disc and a magnetic tape is outputted together with the user's voice or vocal inputted through the microphone, and the accompaniment reproduced and the vocal part by a professional singer recorded are both outputted when the user fails to sing toward the microphone.

Utilizing this arrangement, the user can enjoy singing to the accompaniment as in an ordinary KARAOKE apparatus while also preventing a drawback that only the accompaniment is radiated when the user suddenly forgets the words while he is singing.

FIG. 7 shows a conventional voice selecting circuit. A microphone 1 picks up the voice of the user and outputs the voice signal to an amplifier 2. The output of the amplifier 2 is supplied to a rectifier circuit 31 by which the voice signal is converted into a dc voltage. A comparator 32 compares the dc voltage outputted from the rectifier circuit 31 with a predetermined reference voltage to provide an output. The rectifier circuit 31 and the comparator 32 forms an audio detection circuit 3. Specifically, the comparator provides an L level when the voice input is less than a predetermined level and an H level when the input is more than the predetermined level. A reproducing apparatus 5 reproduces the accompaniment of a selected tune as well as the accompaniment plus vocal part by a professional singer. The recording medium in the reproducing apparatus 5 is a so-called voice multiplex tape or voice multiplex disc in which only the accompaniment is recorded in one of L and R channels and the accompaniment plus vocal part by the professional singer in the other. Only the accompaniment is outputted from, for example, an L channel terminal 5L and the accompaniment plus vocal part by the professional singer from an R channel terminal 5R. A selector switch 4 selects the accompaniment outputted from the reproducing apparatus 5 when the signal from the comparator 32 is the H level and the accompaniment plus vocal when the signal is the L level.

The output of the selector switch 4 is supplied to a mixer circuit 6 which mixes the output from the selector switch 4 with the output of the amplifier 2 to provide thus mixed audio signal to a loudspeaker 7.

When the voice input level through the microphone 1 exceeds the predetermined level, for example, when the user is singing, the singing voice of the user and the accompaniment from the reproducing apparatus 5 are radiated from the loudspeaker 7. When the voice input level through the microphone is less than the predetermined level, for example, when the user stops to sing, the singing voice of the professional singer and the accompaniment from the reproducing apparatus 5 are radiated from the loudspeaker 7.

However, the aforementioned conventional voice selecting circuit suffers from a drawback that when the user's voice level drops to less than the predetermined level, the vocal part by the professional singer suddenly appears and therefore the audience feels uncomfortable.

SUMMARY OF THE INVENTION

An object of the present invention is to provide a reproducing apparatus such as the KARAOKE apparatus with a voice selecting function by which the reproduced sound is smoothly and gradually switched. In the present invention, a reproducing apparatus mixes the voice information from a microphone and the information reproduced from a recording medium in which a vocal signal and an instrumental signal is contained as a first signal in a first channel and only an instrumental signal is contained as a second signal in a second channel. A first mixing circuit mixes the first signal and the second signal. The output of the first mixing circuit is mixed by a second mixing circuit with the voice information from the microphone. In accordance with the level of an input signal to the microphone, a control circuit or audio detecting circuit provides a control signal. This control signal controls a selection control circuit to gradually vary the relative level between the first signal and the second signal when mixing these two signals.

The control signal may also be arranged to cause the reproduced information to decrease when the voice information from the microphone increases in level and to increase when the voice information decreases.

BRIEF DESCRIPTION OF THE DRAWINGS

Features and other objects of the invention will be more apparent from the description of preferred embodiments with reference to the accompanying drawings in which:

FIG. 2 illustrates signals of various parts of the circuit in FIG. 1;

FIG. 4 illustrates signals of various parts of the circuit in FIG. 3;

FIG. 6 illustrates signals of various parts of the circuit in FIG. 5; and

DESCRIPTION OF PREFERRED EMBODIMENTS

Figure 7:
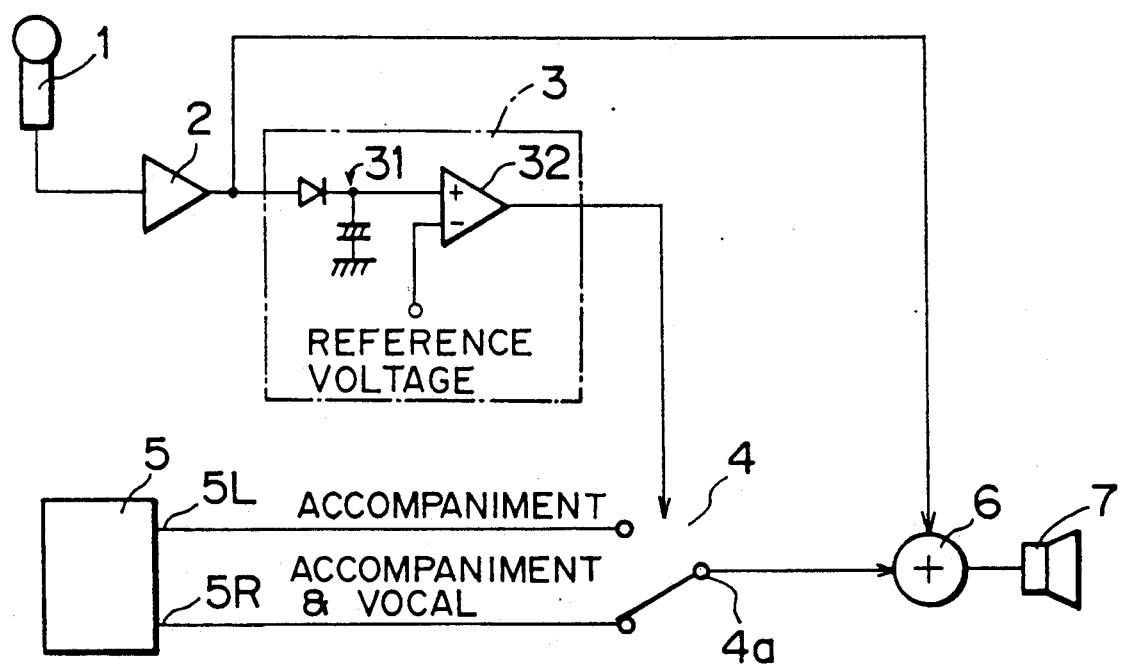
FIG. 7 is the circuit of a prior art voice selecting circuit.

Preferred embodiments of the invention will now be described with reference to the drawings. Elements similar to those in FIG. 7 have been given similar reference numerals throughout the remaining drawings and their detailed description are omitted.

FIRST EMBODIMENT

Figure 1:
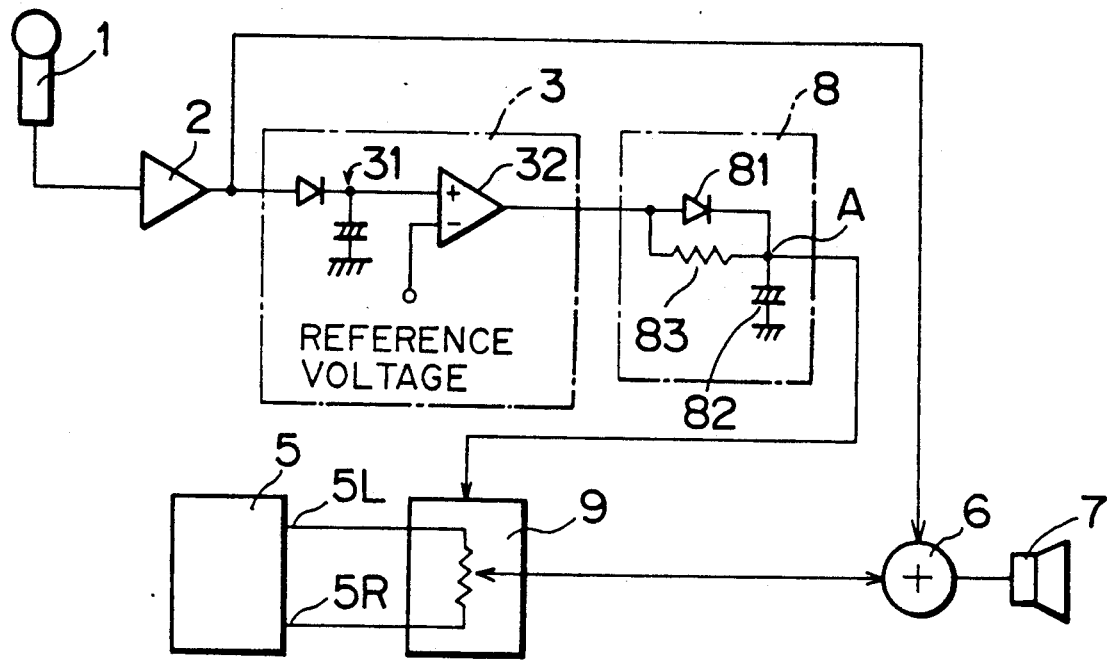
FIG. 1 is the circuit diagram of a first embodiment of the invention.

FIG. 1 is the circuit diagram of a first embodiment of the invention. A selection control circuit 8 provides a control voltage in accordance with the output of the audio detecting circuit 3. The selection control circuit 8 and the audio detecting circuit 3 form a control means for providing a control signal which controls the audio level adjusting circuit 9. An audio level adjusting circuit 9 functions as a first mixing means for mixing the reproduced signal from the output terminal 5L and the reproduced signal from the output terminal 5R. The audio level adjusting circuit 9 outputs the L and R channel components to a mixer circuit 6 while increasing the L channel component and decreasing the R channel or vice versa in accordance with the control voltage. In the selection control circuit 8, a parallel circuit of a diode 81 and a discharge resistor 83 is connected in series with the output of the comparator 32, and a capacitor 82 is connected between the output of the parallel circuit and the ground. The voltage across the capacitor 82 is outputted as a control voltage from a point A.

In the reproducing apparatus 5, the L channel provides only the accompaniment and the R channel provides the accompaniment plus vocal. The audio level adjusting circuit 9 causes the L channel component to be outputted at a greater level than the R channel component when the control voltage is raised, and causes the R channel component to be outputted at a greater level than the L channel component when the control voltage is lowered.

FIG. 2 illustrates signals of various parts of the circuit in FIG. 1. The input level of the microphone 1 is shown in FIG. 2A, the output of the comparator in FIG. 2B, the control voltage in FIG. 2C, and the L and R channel outputs from the audio level adjusting circuit 9 in FIG. 2D.

When the input level to the microphone is low, for example, the introduction part of the tune is being reproduced and the user is not singing yet, both the output level of the comparator 32 and the output level of the control voltage are the L level; therefore the output signal of the audio level adjusting circuit 9 is dominated by R channel component.

When the user starts singing causing the input level to the microphone to reach a predetermined level (level K in FIG. 2A), the output level of the comparator 32 changes from the L level to the H level, which biases the diode 81 in the forward direction allowing the voltage across the capacitor 82 to rise up. Thus, the control voltage, which is the voltage across the capacitor 82, changes to the H level causing the L channel component to increase rapidly and the R channel component to decrease rapidly. This allows the user to sing to the accompaniment outputted from the L channel.

When the input level to the microphone becomes low, for example, the user stops to sing, the output level of the comparator 32 changes from the H level to the L level (point Q in FIG. 2). This causes the diode 81 to be reverse biased allowing the capacitor 82 to gradually discharge through the discharge resistor 83 which in turn causes the control voltage to slowly change from the H level to the L level. Thus, the L channel component in the output signal of the audio level adjusting circuit 9 decreases gradually and the R channel component increases slowly. This causes the vocal part of the professional singer to gradually increase in level but allows the resultant sound level of the accompaniment to remain the same.

In this manner, when the input level to the microphone 1 decreases to a level less than the predetermined level, the vocal part by the professional singer will not be radiated immediately from the loudspeaker 7 in the full sound level thereof. Furthermore, even if the input level becomes below the predetermined level for a very short time when the user breathes while he is singing, the vocal part by the professional singer will not appear at once in the full sound level thereof.

SECOND EMBODIMENT

Figure 3:
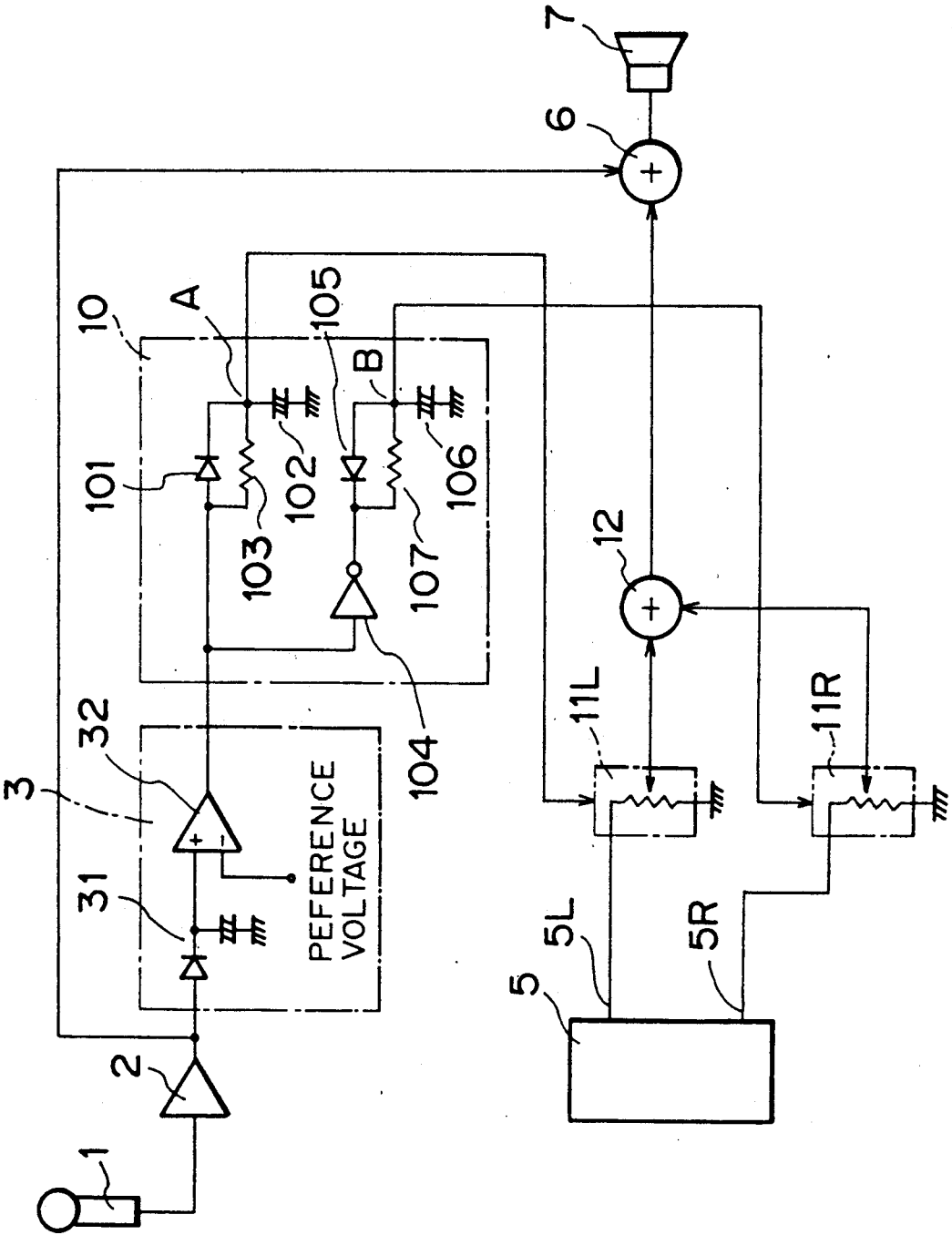
FIG. 3 is the circuit diagram of a second embodiment of the invention.

FIG. 3 is the circuit diagram of a second embodiment of the invention. A selection control circuit 10, which is formed of a diode 101, a capacitor 102, and a charging resistor 103, is of the same construction as that in the first embodiment in FIG. 1 and the L channel control voltage is outputted from the point A.

An inverter 104 inverts the output signal of the comparator 32 in the audio detection circuit 3. Connected in series with the output of the inverter 104 are a diode 105 and a charging resistor 107, and connected in parallel with the diode 105 is the charging resistor 107. An R channel control voltage is outputted from a point B.

An L channel audio level adjusting circuit 11L provides a proper level of the L channel component by increasing or decreasing the output level thereof in accordance with the L channel control voltage. An R channel audio level adjusting circuit 11R provides a proper level of the R channel component by increasing or decreasing the output level thereof in accordance with the R channel control voltage. FIG. 4 illustrates signals of various parts of the circuit in FIG. 3. The input level to the microphone 1 is shown in FIG. 4A, the output of the comparator 32 in FIG. 4B, the L channel control voltage (Lc) and the R channel control voltage (Rc) in FIG. 4C, and the L and R channel outputs from the mixer circuit 12 in FIG. 4D.

When the input level to the microphone 1 is low, the output level of the comparator 32 and the L channel control voltage (Lc) are the L level and the output level of the R channel control voltage (Rc) is the H level; the capacitor 106 is charged up. Thus, the mixer circuit 12 is supplied with a relatively high level of R channel signal from the R channel audio level adjusting circuit 11R and a relatively low level of L channel signal from the L channel audio level adjusting circuit 11L.

When the microphone input reaches the predetermined level (point K in FIG. 4A), the output level of the comparator 32 turns from the L level to the H level causing the capacitor 102 to be rapidly charged up and the output of the inverter 104 to change to the L level which in turn allows the capacitor 106 to discharge quickly through the diode 105. Therefore, the L channel component of the output of the mixer circuit 12 will rapidly increase and the R channel component will rapidly decrease.

When the microphone input decreases below a predetermined level (point Q in FIG. 4), the output level of the comparator 32 turns from the H level to the L level causing the capacitor 102 to slowly discharge and the output of the inverter 104 to change to the H level which in turn allows the capacitor 106 to slowly be charged through the charging resistor 107, thereby slowly changing the R channel control voltage from the L level to the H level. Therefore, the L channel component of the output of the mixer circuit 12 will slowly decrease and the R channel component will slowly decrease.

THIRD EMBODIMENT

Figure 5:
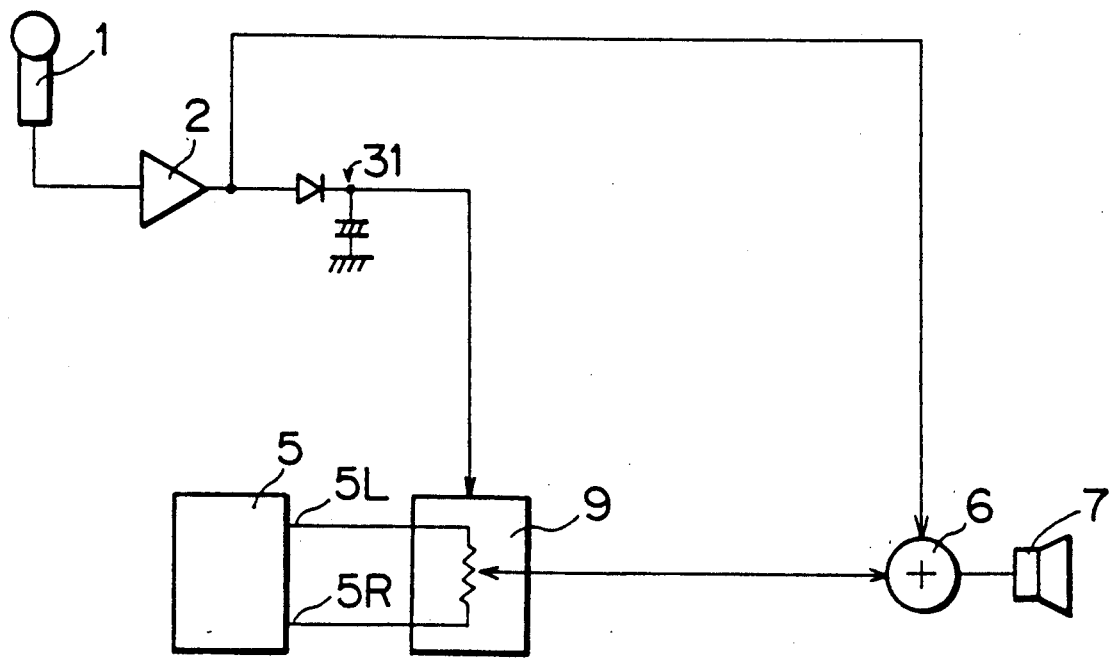
FIG. 5 is the circuit diagram of a third embodiment of the invention.

FIG. 5 shows a third embodiment of the invention in which both the L and R channel output signal levels from the audio level adjusting circuit 9 are increased or decreased in accordance with the input voice level to the microphone. In the figure, a rectifier circuit 31 detects the output of the amplifier 2 and provides the audio level adjusting circuit 9 with a voltage proportional to the average voice level to the microphone. The audio level adjusting circuit 9 outputs both the L and R channel components of proper levels by decreasing the L channel component and increasing the R channel component or vice versa.

For example, when the input level to the microphone 1 increases as shown in FIG. 6A, the output of the rectifier circuit 31 increases causing the L channel output signal from the audio level adjusting circuit 6 to increase and the R channel output signal to decrease.

When the input level to the microphone 1 decreases gradually as shown in FIG. 6A, the output of the rectifier circuit 31 decreases causing the L channel output signal from the audio level adjusting circuit 6 to gradually decrease and the R channel output signal to slowly increase. Therefore, when the voice level of the user decreases gradually, the vocal part by the professional singer gradually increases. This prevents the vocal part by the professional singer from suddenly popping out loudly from the loudspeaker 7.

What is claimed is:

1. A reproducing apparatus for mixing voice information from a microphone and information reproduced from a recording medium in which a vocal signal and an instrumental signal are contained as a first signal in a first channel and only an instrumental signal is contained as a second signal in a second channel, comprising:
   a first mixing means for mixing said first signal and said second signal;
   a second mixing means for mixing said voice information from the microphone and an output of said first mixing means;
   control means for providing a control signal in accordance with a level of an input signal to the microphone;
   wherein said first mixing means comprises means for gradually varying a mixing ratio of said first signal and said second signal in accordance with said control signal.

2. A reproducing apparatus according to claim 1, wherein said control signal controls said first mixing means such that when said input signal to the microphone decreases below a predetermined level, said first signal gradually becomes dominant relative to said second signal.

3. A reproducing apparatus according to claim 1, wherein said control signal controls said first mixing means such that when said input signal to the microphone exceeds a predetermined level, said second signal gradually becomes dominant relative to said first signal.

4. A reproducing apparatus according to claim 1, wherein said control means comprises a comparing means 3 for comparing said voice information from the microphone with a reference voltage to provide an output signal and a time constant means 8 to which said output signal from the comparing means 3 is supplied.

5. A reproducing apparatus according to claim 1, wherein said means for gradually varying comprises a variable resistor for varying said first signal and said second signal relative to each other.

* * * * *